(No Model.)
C. A. EIDSMOE.
DEVICE FOR PREVENTING COWS FROM KICKING.
No. 606,481.  Patented June 28, 1898.
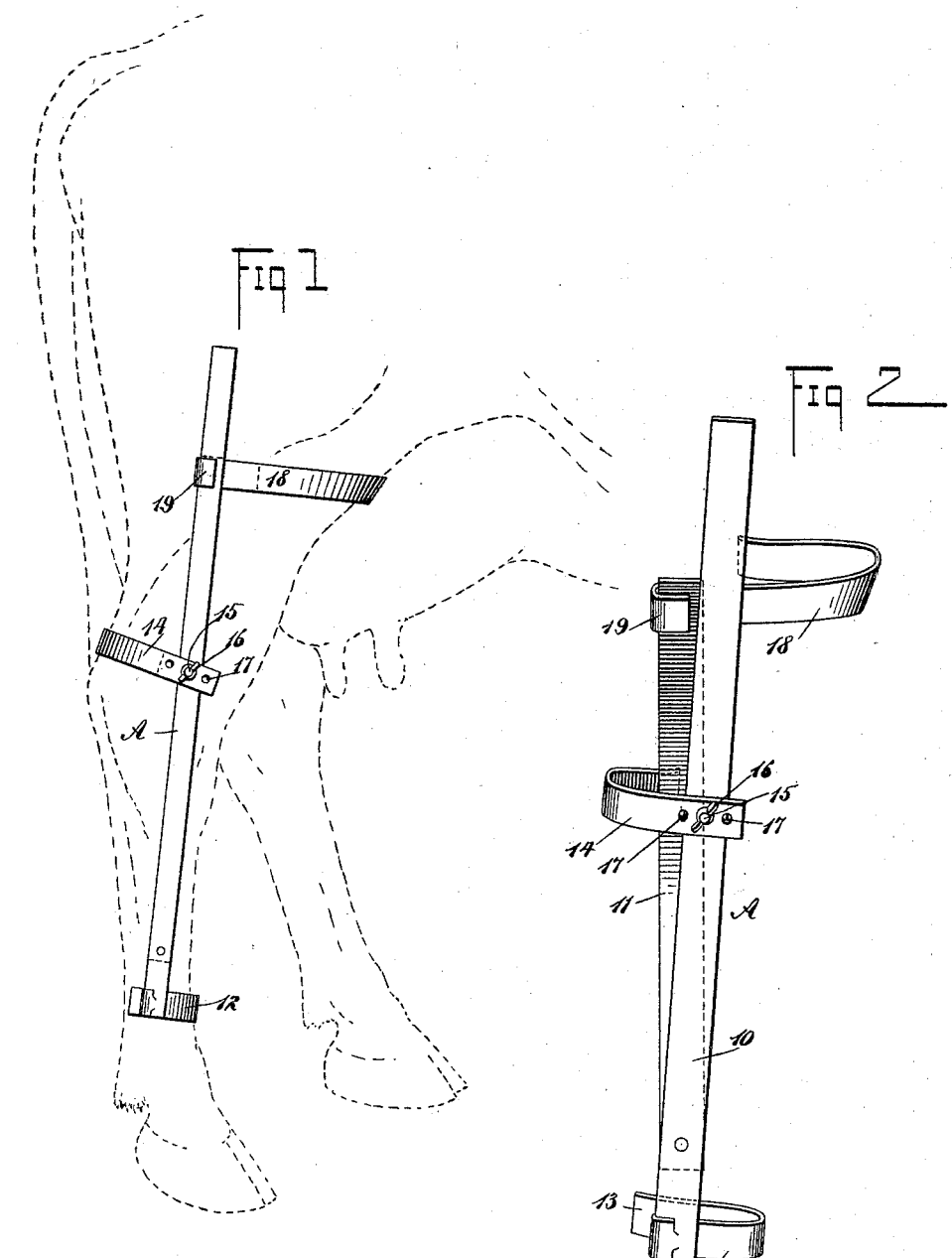

UNITED STATES PATENT OFFICE.

CHRISTOPHER A. EIDSMOE, OF PLEASANT, SOUTH DAKOTA.

DEVICE FOR PREVENTING COWS FROM KICKING.

SPECIFICATION forming part of Letters Patent No. 606,481, dated June 28, 1898.

Application filed March 7, 1898. Serial No. 672,923. (No model.)

*To all whom it may concern:*

Be it known that I, CHRISTOPHER A. EIDSMOE, of Pleasant township, in the county of Lincoln and State of South Dakota, have invented a new and useful Device to Prevent Cows from Kicking, of which the following is a full, clear, and exact description.

The object of the invention is to provide a device that will prevent a cow from kicking and which will be of simple and economic construction, capable of being conveniently and expeditiously applied to a hind leg of a cow, and which when applied will not prove injurious to the animal.

A further object of the invention is to provide a device of the above-named character which will effectually prevent the animal from raising her foot and getting it in a pail or make a movement capable of upsetting the pail.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1 is a side elevation of the device applied, and Fig. 2 is a perspective view of the device partially open.

The body A of the device consists of a brace-bar 10, of sufficient length to extend from the hock well up along the thigh of the animal, and a shorter bar 11, pivoted at its lower end to the inner face of the longer bar 10 at a point slightly above the lower end of said longer bar. The shorter or inner bar 11 does not extend upward as far as the outer or longer bar 10, as shown in Fig. 2.

An open binding-band 12 is secured to the lower end of the longer bar 10, and consists of a strip of metal secured at one end to the said body-bar, being carried forward along the inner face of the said bar for a predetermined distance, then bent upon itself, and returned beyond the rear edge of the said longer bar, as shown in Fig. 2, and the free end of the binding-band 12 is curved away from the space between its members, as shown at 13 in Fig. 2, so that when the band when being placed upon the hock of the animal will not lacerate it.

A second open binding-band 14 is attached to the outer or longer body-bar 10 at or near its center. This binding-band is constructed in like manner as the band 12, but it is adjustably secured to the outer face of the said body-bar 10, and its curved portion extends rearward its open portion, facing forward. The adjustable attachment is preferably made by securing a stud 15 on the bar 10 and providing a series of openings 17 in the band, either of which openings is capable of receiving said stud, the outer end of which is threaded and provided with a thumb-nut 16.

A third and upper binding-band 18 is provided for the device; but this binding-band is attached to the rear face of the inner body-bar 11 at its upper end and is carried forward and then rearward, its open portion facing the rear. The upper binding-band 18 is larger and of greater sweep than the other binding-bands. An open loop 19 is also secured to the upper end of the shorter and inner body-bar 11, the loop extending forwardly over the outer face of the said bar, as shown in Fig. 2.

In the application of the device the two body-bars 10 and 11 are separated and carried at angles to one another. The lower open binding-band is then slipped around the hock from the front and the two body-bars are brought together, causing the intermediate open binding-band, which is loose at the time, to engage with the rear of the leg above the ankle or gambrel joint and adjust itself thereto, while at the same time the upper open binding-band 18 will engage with the thigh of the animal at the front, and when the longer body-bar is carried into the loop 19 of the shorter body-bar the device will be perfectly locked on the leg of the animal, the body-bar extending vertically along the outer surface of the leg from the hock up above the thigh.

Having thus described my invention, I claim as new and desire to secure by Letters Patent—

1. A device to prevent cows from kicking, consisting of two main pivotally-connected members, oppositely-disposed clamps on said members, adapted to embrace the leg of the animal and prevent flexure thereof, and means for locking the device in place on the leg of the animal, for the purpose set forth.

2. A device to prevent cows from kicking, consisting of a body constructed of two pivotally-connected members, one member being provided with a lower and with an intermediate open clamping-band, which bands face in opposite directions, the other member being provided with an upper open clamping-band facing in the same direction as the lower clamping-band, and a locking connection between the two members of the body, for the purpose set forth.

3. In a device to prevent cows from kicking, a body comprising an outer bar, and an inner bar of less length than the outer bar and pivoted thereto, an open clamping-band secured to the lower end of the longer body-bar and facing rearward, an adjustable open binding-band pivoted on the said longer body-bar intermediate of its ends, a locking device for the intermediate band, a larger open clamping-band secured to the upper end of the shorter body-bar and facing in the same direction as the lower open band, and means for locking the two body-bars together, for the purpose specified.

4. In a device to prevent cows from kicking, the combination, with a body comprising an inner and an outer bar pivotally connected, the outer bar being the longer one and the inner bar being pivotally attached to the outer bar at a point near the lower end of the latter, of an open binding-clamp secured to the lower end of the longer body-bar and facing to the rear, a second open clamping-band pivoted upon the longer body-bar and facing to the front, a locking device for the said intermediate band, a larger open clamping-band secured to the upper end of the shorter body-bar and facing rearward, and an open loop located upon the outer face of the shorter body-bar and facing forwardly, said loop being adapted to receive within it the longer body-bar, as and for the purpose specified.

CHRISTOPHER A. EIDSMOE.

Witnesses:
AUGUST FRIEBERG,
CHAS. W. WOLBERT.